Patented May 3, 1932

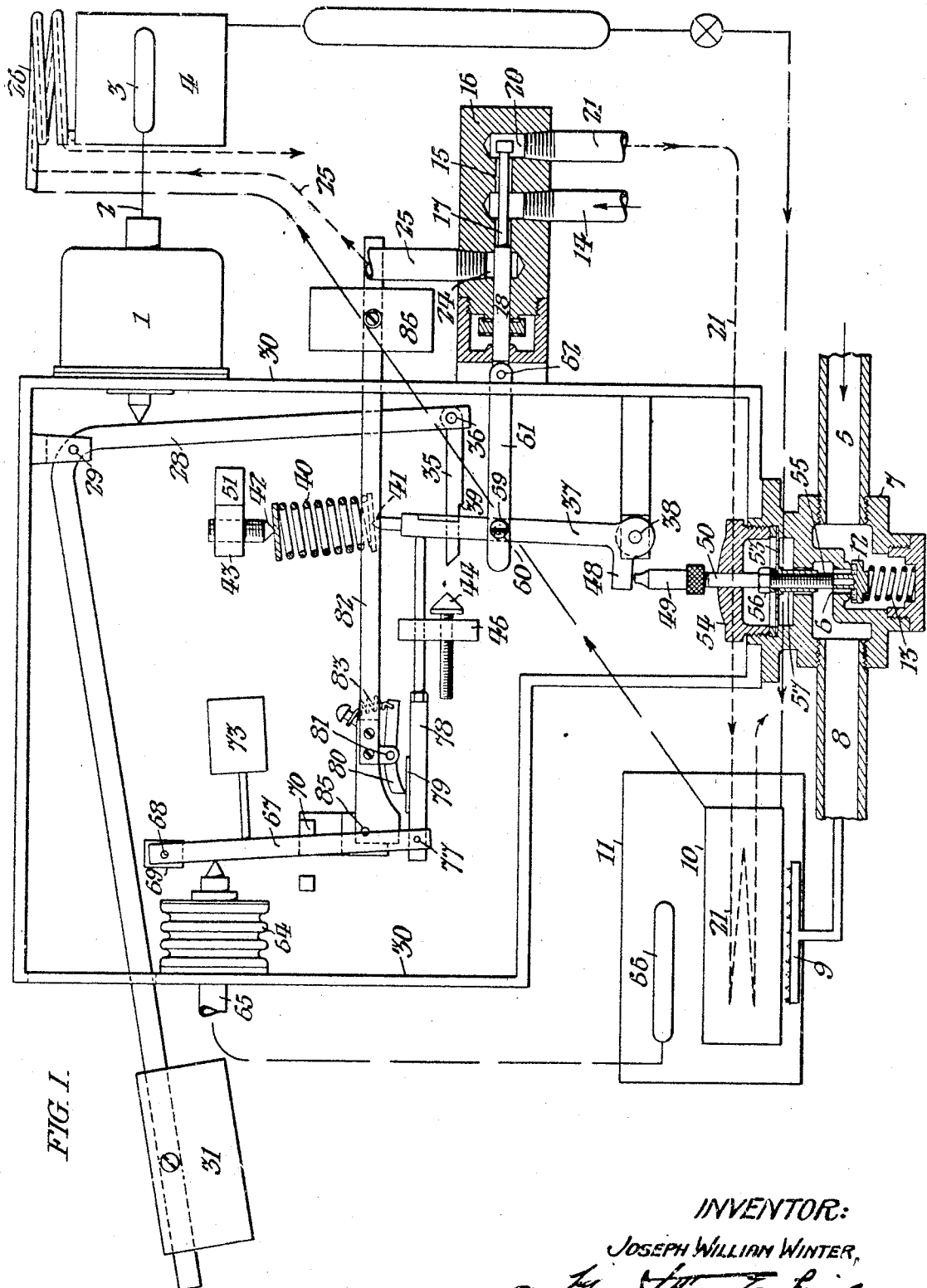
FIG. I.
INVENTOR:
JOSEPH WILLIAM WINTER,

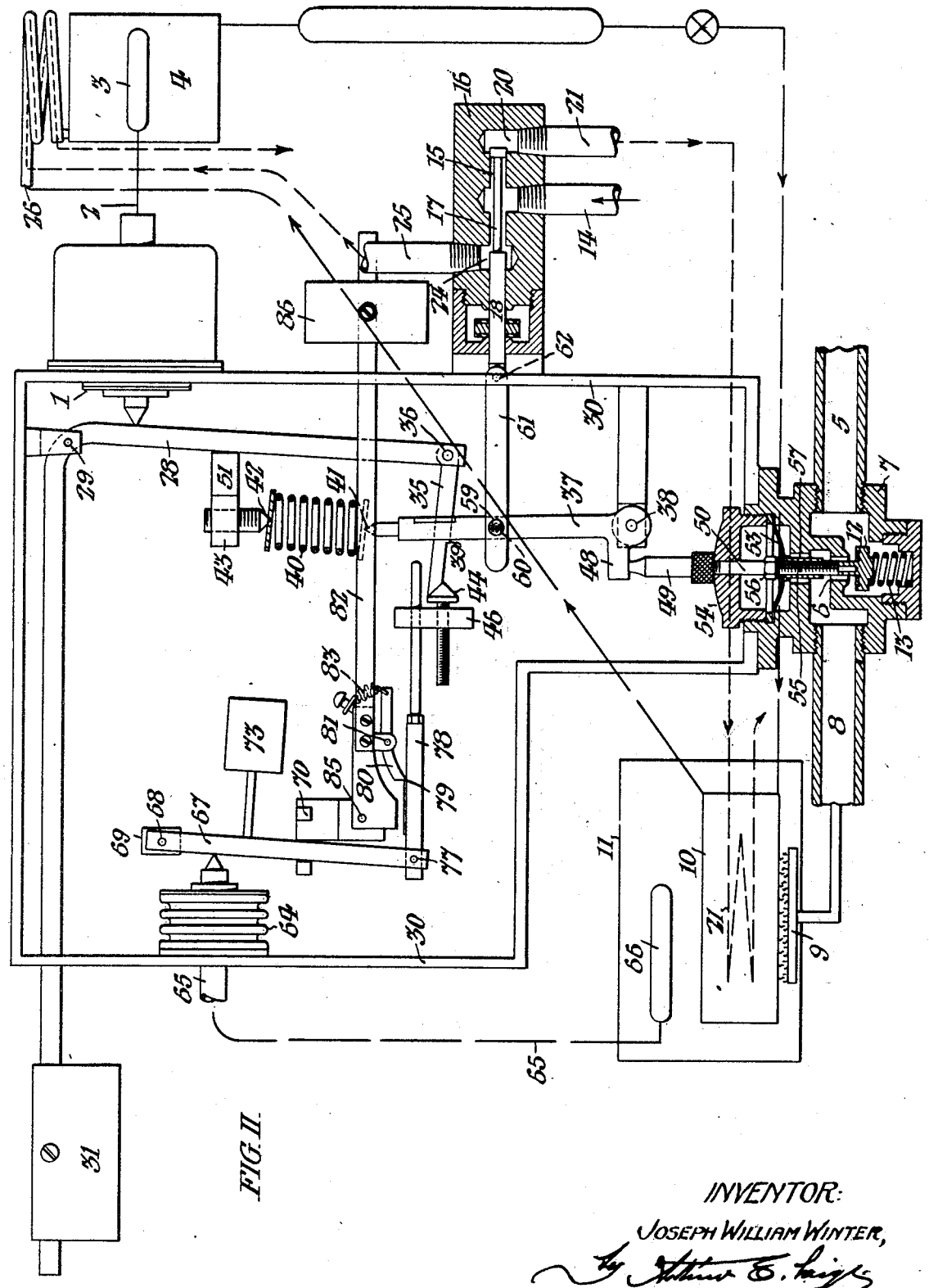

1,857,105

UNITED STATES PATENT OFFICE

JOSEPH WILLIAM WINTER, OF PENFIELD, PENNSYLVANIA, ASSIGNOR TO MASTER DOMESTIC REFRIGERATING COMPANY, INC., OF CONSHOHOCKEN, PENNSYLVANIA, A CORPORATION OF NEW YORK

REFRIGERATING APPARATUS

Application filed August 8, 1930   Serial No. 473,898.

My invention relates to such apparatus of the automatically operative absorption type. Such apparatus includes a gas generator wherein a refrigerant, such as an aqueous solution of ammonia or similar liquefiable fluid, is intermittently heated to generate ammonia gas from the solution, and cooled, conveniently by a stream of water, to permit the residual solvent to reabsorb said gas; a condenser to which said gas is conducted from said generator, and in which it is condensed while heat is absorbed therefrom, conveniently by a stream of water; and an evaporator to which the condensed refrigerant is conducted, and which is located in the refrigerator inclosure which is to be cooled and from which heat is absorbed by the refrigerant during its expansion to a gaseous state, by such heat. The refrigerant gas from said evaporator is conducted back to the generator, in which it is reabsorbed by the residual water, which has been cooled, and from which it is regenerated by heating said generator, to again pass thru the cycle of changes aforesaid.

My invention is particularly applicable to such apparatus wherein the source of heat is a gas burner, and includes automatically operative means for opening and closing valves controlling both the supply of fuel gas to the burner and the supply of cooling water to the condenser and generator, so as to automatically control the operation of the apparatus.

My invention includes the various novel features of construction and arrangement hereinafter more definitely specified.

In said drawings; Fig. I is a diagrammatic representation of refrigerating apparatus including a convenient embodiment of my invention.

Fig. II is a diagram, similar to Fig. I, but showing the valve control mechanism in a different position.

In said figures, the corrugated metal bellows 1 contains a thermostatic fluid so arranged as to be expanded and contracted in accordance with the temperature of some space which is to be cooled. For instance, the fluid in said bellows may be connected by the conduit 2 with the bulb 3 in the chamber 4 of the refrigerant evaporator included in the refrigerating system to be cooled.

In such embodiment, the function and effect of said thermostat 1 is to control the supply of fuel gas and an auxiliary refrigerant, for instance, water, in accordance with the changes in temperature in said chamber 4. Fuel gas is supplied from the conduit 5 thru the valve port 6 in the valve casing 7 and thru the conduit 8 to the burner 9 beneath the generator 10 in the combustion chamber 11. In the position of the apparatus shown in Fig. I, said valve port 6 is closed by the puppet valve 12, under pressure of the spring 13.

The auxiliary refrigerant is supplied from the conduit 14 thru the passage 15 in the two-way valve casing 16 around the reduced portion 17 of the slide valve 18 which is mounted to reciprocate in said casing. Said refrigerant flows from said passage 15 thru the port 20 and the conduit 21 to cool the main refrigerant solution contents of said generator 10.

Said valves 12 and 18 remain in the position shown in Fig. I, during the absorption period of the apparatus, i. e., while the liquid contents of the generator 10 are being cooled so as to absorb the main fluid refrigerant previously evaporated therefrom by the maximum operation of said burner 9. During that period, the atmosphere in said chamber 4 gradually rises in temperature by absorption of heat from the contents of the refrigerator until a critical temperature is reached, at which said bellows 1 operates by expansion to contemporaneously open said fuel valve 12 to heat the contents of the generator to redischarge therefrom the main refrigerant which has been absorbed therein during such absorption period, and, contemporaneously shift said slide valve 18 to shut off the supply of cooling auxiliary refrigerant from the conduit 14 thru said pipe 21 by closure of said passage 15 at the right hand end thereof by the end portion of said valve 18 which is of full diameter. Such movement of said valve 18 contemporaneously opens communication from said auxiliary refrigerant supply pipe 14 thru said passage 15 and the port 24 in said casing 16 and the conduit 25 to supply said auxiliary refrigerant to the condenser 26. Said valves 12 and 18 remain in the position last above described during the generating period of operation of the refrigerating apparatus, i. e., while the main refrigerant is being driven off from the solution in the generator by the heat from the burner 9 and is passing thru the condenser 26 in which it is condensed to the liquid state and from which it is delivered into the evaporator 4.

In order to effect the above described coordinate relation of said valves 12 and 18; I find it convenient to connect said bellows 1 with said valves by the means including the lever 28 which is fulcrumed at 29 in the casing 30 and is continually thrust to the right by the weight 31. Said weight 31 is adjustable to variably determine the pressure at which it will yield to permit said lever 28 to be swung to the left. Of course, as the pressure of expansion of the fluid in the bellows 1 is determined by the temperature in the chamber 4, the adjustment of said weight 31 determines the temperature at which said lever 28 is thus shifted.

Said lever 28 has the latch 35 connected by the pivot 36 at the lower end thereof and adapted to slide thru a slot in the bell crank lever 37 which is fulcrumed at 38 in said casing 30. Said latch has the shoulder 39 adapted to encounter said lever 37 during the movement of said lever 28 to the left, to thrust said lever 37 to the left from the position shown in Fig. I, in which it is normally retained by the toggle spring 40 which is pivotally connected with the upper end of said lever 37 at 41 and pivotally connected with the adjustable abutment 42 which is rigidly connected with the lug 43 in said casing 30; so that the pressure of said spring 40 may be varied. The purpose of said spring is to thrust said lever 37 with a snap action alternately to opposite limits of its range of movement, whenever said lever 37 is pushed past the dead center line extending between said pivots 38 and 42, in either direction. To permit the movement of said lever 37 to the right, independently of said latch 35, by the means hereinafter described, I provide the inclined abutment 44 which is axially adjustable thru the stationary lug 46 in said casing 30, and is so adjusted that it is encountered by the end of said latch 35 at the limit of movement of the latter to the left to raise said shoulder 39 out of engagement with said lever 37.

Said lever 37 has the arm 48 overhanging the axially adjustable cap 49 on the stem 50 of said fuel gas controlling valve 12; so that movement of said levers 28 and 37 to the left to a sufficient extent opens said valve 12. The range of such movement of the lever 28 is limited by the stationary stop member 51 on said lug 43 in said casing 30, and the effect of such movement upon said valve 12 is, of course, permanently limited by the location of the shoulder 39, and variably limited by the adjustment of said valve stem cap 49 which is in screw threaded connection with the valve stem 50; so that the extent of opening of said valve 12, as a consequence of the expansion of the bellows 1, is variably adjustable to determine the maximum flow of gas to the burner 9.

In order to permit the operation of said valve 12 with the minimum amount of resistance; I have avoided the use of any stuffing box for said valve stem 50 but prevent escape of gas from said casing 7 by providing said stem with the flexible resilient diaphragm 53 which is secured in said casing 7 by the screw cap 54 and, with the assistance of the spring 13, normally holds said valve 12 shut, as shown in Fig. I.

Said valve stem 50 is rendered axially adjustable thru said diaphragm 53, in accordance with the desired range of movement of said valve 12, by providing said stem with the screw thread 55 for engagement with the nuts 56 and 57 between which said diaphragm 53 may be clamped in the required axial position.

Said bell crank lever 37 has the screw stud 59 extending through the slot 60 in the link 61 which is pivotally connected at 62 with the end of said slide valve 18. Such construction and arrangement permit the valve 12 to be opened while the valve 18 remains stationary; the extent of the differential movement of said valves being determined by the length of said slot 60.

The apparatus shown, is so adjusted that the maximum temperature attained in the chamber 4 is 45° F., and, while the slide valves 12 and 18 are in the position shown in Fig. I, with the gas supply to the burner 9 reduced to the minimum and the stream of cooling water flowing thru the conduit 21; the internal pressure of the refrigerant solution in said generator 10 falls to twenty pounds per square inch at a temperature of 70° F. During that period, the temperature in the chamber 4 gradually rises to 45° F., and, at the latter, the bellows 1 operates to open the valve 12, as above described, to the position shown in Fig. II, and shut off the cooling water from the generator and turn on the cooling water to the condenser. Thereupon, the contents of said generator are gradually heated to, say, 230° F., and a pressure of one hundred and sixty pounds per square inch. Thereupon, it is required to restore said valves 12 and 18 to the position shown in Fig. I, and such operation is effected by the thermostatic device including the corrugated metal bellows 64 which is connected by the conduit 65 with the bulb 66 containing thermostatic fluid, in the combustion chamber 11. Said thermostatic bellows 64 is adapted to then swing, to the right, the lever 67 which is fulcrumed at 68 on the lug 69 in said casing 30 and has its range of movement limited by the lug 70 in said casing. In order to adjustably determine the pressure and consequent temperature at which said bellows 64 operate said lever 67, I oppose it by the adjustable weight 73 which continually tends to thrust said lever 67 to the left.

Said lever 67 is connected by the pivot 77 at its lower end with the plunger 78 which is mounted to reciprocate in said lug 46 in opposition to said lever 37, so that when pushed to the right by said bellows 64, it may thrust said lever 37 to the right past the dead center line between the pivots 38 and 42 so that said lever 37 may be snapped to and temporarily detained in, the position shown in Fig. I. However, in order to impart a snap action to said plunger 78, I provide the latter with the projection 79 for engagement with the pawl 80 which is fulcrumed at 81 on the lever 82 and has the spring 83 continually stressing said pawl into engagement with the end of said projection 79. Said lever 82 is fulcrumed at 85 on said lug 70 and provided with the adjustable weight 86.

The construction and arrangement above described are such that the pressure of the thermostatic fluid in the bellows 64 is permitted to accumulate without thrust of said plunger 78 against said lever 37, until such pressure against the pawl 80 tilts the lever 82 upward far enough for said projection 79 to slip past the left hand end of said pawl with a snap action of said plunger 78 against said lever 37. Of course, the pressure and consequent temperature at which such snap action is effected to shift the valve lever 37 to the position shown in Fig. I and permit said valve to shut, is variably determinable by adjustment of said weights 73 and 86.

Thereupon, said fuel gas valve 12 remains closed, as shown in Fig. I, until the cycle of operation of the refrigerating system is repeated as above described.

The specific construction and arrangement of the two-way valve in the casing 16 above described is the subject matter of my copending application Serial No. 333,333 filed January 18, 1929 for Letters Patent of the United States, and it is to be understood that other suitable valve means may be employed, in lieu thereof, in the combinations herein claimed. Moreover, my copending application Serial No. 334,382 filed January 23, 1929 includes claims for refrigerating apparatus including valve means controlling the supply of fuel gas to the generator burner and an auxiliary refrigerant to the generator and condenser, controlled by a single thermostat arranged to operate such valve means in accordance with the temperature of a region local to said generator.

Therefore, I do not desire to limit myself to the precise details of construction and arrangement herein set forth, as it is obvious that various modifications may be made therein without departing from the essential features of my invention, as defined in the appended claims.

I claim:

1. In refrigerating apparatus of the absorption type, including a generator, a condenser, and an evaporator; the combination with a gas burner arranged to heat said generator, an auxiliary refrigerant conduit to said generator and an auxiliary refrigerant conduit to said condenser; of automatically operative valve means controlling the supply of fuel gas to said burner and said auxiliary refrigerant to said generator and to said condenser; and thermostatic means arranged to operate said valve means in accordance with the temperature of a region being refrigerated by said apparatus; including a corrugated metal bellows, a lever adapted to be shifted by said bellows, and a pawl lever provided with a weight, adapted to restrain said bellows lever until there is sufficient pressure accumulated in said bellows to tilt said pawl lever and thereby release said bellows lever and permit snap action thereof.

2. In refrigerating apparatus of the absorption type, including a generator, a condenser, and an evaporator, the combination with a gas burner arranged to heat said generator; a cooling water conduit to said generator, and a cooling water conduit to said condenser; of a valve controlling the supply of gas to said burner; and thermostatically operative means adapted to impart a snap action to said valve, including a toggle lever adapted to press the stem of said valve to open it, a toggle spring pivotally connected with said toggle lever and adapted to hold said valve lever detained in both extremes of its movement; a slide plunger adapted to be thrust against said valve lever to displace it and permit said valve to open; a thermostatic bellows containing a fluid affected by the temperature in the generator; a bellows lever carrying said plunger and in cooperative relation with said bellows; a projection on said plunger; a spring pressed pawl adapted to engage said projection; and a lever carrying said pawl and provided with a weight; whereby when said projection is engaged by said pawl, movement of said plunger is restrained until pressure accumulates in said bellows sufficient to uplift and disengage said pawl by movement of said plunger, and permit snap action of said plunger to thrust said valve lever and permit said gas valve to be shut instantaneously.

3. In a refrigerating apparatus controlling device, the combination with a valve, of a thermostatic bellows movable in accordance with variations in temperature in said apparatus; a bellows lever adapted to be moved by said bellows; a slide plunger pivotally connected with said bellows lever and adapted to operate said valve in one extreme position of said bellows; and means adapted to normally restrain the movement of said plunger, including a pawl adapted to engage said plunger and a weighted lever carrying said pawl; whereby pressure accumulated in said bellows stresses said plunger with minimum movement of the latter until such movement disengages said pawl and permits snap action of said plunger to operate said valve; the weight on said pawl carrying lever being adjustable to variably predetermine the pressure at which such snap action is effected.

4. In a refrigerating apparatus; the combination with a gas burner; of a valve controlling the supply of gas to the burner; thermostatically operative means adapted to move said valve; and adjustably variable means for controlling the operation of said valve, including a lever carrying a pawl and a weight; said pawl being adapted to normally engage and restrain said valve operating means to a degree variable in accordance with the position of said weight on its lever; whereby said pawl is disengaged and said valve operated when a predetermined pressure is attained.

In testimony whereof, I have hereunto signed my name at Conshohocken, Pennsylvania, this eighteenth day of July, 1930.

JOSEPH WILLIAM WINTER.